United States Patent
Schnell et al.

(10) Patent No.: US 10,421,858 B2
(45) Date of Patent: Sep. 24, 2019

(54) RUBBER COMPOSITION COMPRISING AN EPOXIDE ELASTOMER CROSS-LINKED BY A POLYCARBOXYLIC ACID

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Benoit Schnell, Clermont-Ferrand (FR); Etienne Fleury, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 154 days.

(21) Appl. No.: 15/319,481

(22) PCT Filed: Jun. 16, 2015

(86) PCT No.: PCT/EP2015/063473
§ 371 (c)(1),
(2) Date: Dec. 16, 2016

(87) PCT Pub. No.: WO2015/193312
PCT Pub. Date: Dec. 23, 2015

(65) Prior Publication Data
US 2017/0152381 A1 Jun. 1, 2017

(30) Foreign Application Priority Data
Jun. 18, 2014 (FR) ..................................... 14 55609

(51) Int. Cl.
| | |
|---|---|
| C08L 63/10 | (2006.01) |
| C08G 59/02 | (2006.01) |
| C08G 59/42 | (2006.01) |
| C08G 59/50 | (2006.01) |
| C08K 5/092 | (2006.01) |
| C08K 5/3445 | (2006.01) |

(52) U.S. Cl.
CPC ............ C08L 63/10 (2013.01); C08G 59/027 (2013.01); C08G 59/4253 (2013.01); C08G 59/5073 (2013.01); C08K 5/092 (2013.01); C08K 5/3445 (2013.01); C08L 2312/00 (2013.01)

(58) Field of Classification Search
CPC ... C08K 9/04; C08K 9/06; C08K 9/10; C08K 5/092; C08K 5/3445; C08G 59/027; C08G 59/4253; C08G 59/5073; C08L 63/08; C08L 63/10
See application file for complete search history.

(56) References Cited

U.S. PATENT DOCUMENTS

| | | | |
|---|---|---|---|
| 2,731,481 A | 1/1956 | Harrison et al. | |
| 3,285,949 A | 11/1966 | Siebert | |
| 3,746,686 A | 7/1973 | Marshall et al. | |
| 3,843,466 A | 10/1974 | Akabori et al. | 195/28 |
| 4,626,562 A | 12/1986 | Motomura et al. | |
| 4,650,834 A | 3/1987 | Yagishita et al. | 525/386 |
| 4,723,957 A | 2/1988 | Magruder et al. | |
| 4,758,629 A | 7/1988 | Deyrup et al. | 525/194 |
| 4,882,081 A | 11/1989 | Nichols | |
| 5,140,055 A | 8/1992 | Hirata et al. | |
| 5,576,080 A | 11/1996 | Sugimoto et al. | 428/36.5 |
| 5,665,812 A | 9/1997 | Gorce et al. | |
| 5,721,316 A | 2/1998 | Masse et al. | |
| 6,179,008 B1 | 1/2001 | Kawazura et al. | |
| 6,380,321 B1 | 4/2002 | Robert et al. | |
| 6,774,255 B1 | 8/2004 | Tardivat et al. | |
| 6,845,797 B2 | 1/2005 | Lin et al. | |
| 6,903,165 B2 | 6/2005 | Yabui et al. | |

(Continued)

FOREIGN PATENT DOCUMENTS

| | | |
|---|---|---|
| CN | 1121081 A | 4/1996 |
| CN | 1247198 A | 3/2000 |

(Continued)

OTHER PUBLICATIONS

International Search Report dated Sep. 10, 2015, issued by EPO in connection with International Application No. PCT/EP2015/063473.
French Search Report dated Feb. 11, 2015, issued by INPI in connection with FR Application No. 1455609.

(Continued)

*Primary Examiner* — Edward J Cain
(74) *Attorney, Agent, or Firm* — Venable LLP

(57) ABSTRACT

A rubber composition is based on at least one predominant elastomer comprising epoxide functional groups, silica as predominant reinforcing filler, an agent for covering the silica, and a system for crosslinking the elastomer comprising an imidazole and a polycarboxylic acid of general formula (I):

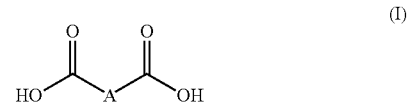

and an imidazole of general formula (II):

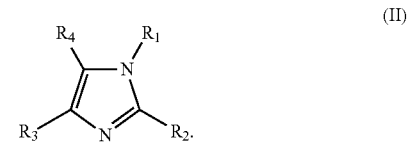

53 Claims, No Drawings

(56) References Cited

U.S. PATENT DOCUMENTS

| | | | |
|---|---|---|---|
| 7,199,175 B2 | 4/2007 | Vasseur | |
| 7,217,751 B2 | 5/2007 | Durel et al. | |
| 7,250,463 B2 | 7/2007 | Durel et al. | |
| 7,300,970 B2 | 11/2007 | Durel et al. | |
| 7,488,768 B2 | 2/2009 | Tardivat et al. | |
| 7,491,767 B2 | 2/2009 | Durel et al. | |
| 7,534,917 B1 | 5/2009 | Ngo et al. | 562/595 |
| 7,820,771 B2 | 10/2010 | Lapra et al. | 525/479 |
| 7,900,667 B2 | 3/2011 | Vasseur | |
| 8,148,458 B2 | 4/2012 | Yagi et al. | |
| 8,461,269 B2 | 6/2013 | Varagniat et al. | 525/209 |
| 8,492,475 B2 | 7/2013 | Araujo Da Silva et al. | |
| 8,883,929 B2 | 11/2014 | Gandon-Pain et al. | 525/326.5 |
| 8,980,392 B2 | 3/2015 | Guy et al. | |
| 9,000,092 B2 | 4/2015 | Belin et al. | |
| 9,340,626 B2 | 5/2016 | Araujo Da Silva et al. | |
| 2002/0048641 A1 | 4/2002 | Yamaguchi et al. | |
| 2003/0120007 A1 | 6/2003 | Bortolotti et al. | |
| 2003/0130401 A1 | 7/2003 | Lin et al. | |
| 2003/0152758 A1 | 8/2003 | Huynh-Tran et al. | |
| 2003/0212185 A1 | 11/2003 | Vasseur | |
| 2004/0019144 A1 | 1/2004 | Bortolotti et al. | 524/492 |
| 2004/0051210 A1 | 3/2004 | Tardivat et al. | |
| 2004/0116613 A1 | 6/2004 | Yabui et al. | 525/329.1 |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2006/0042730 A1 | 3/2006 | Tomiyama et al. | |
| 2006/0086450 A1 | 4/2006 | Hogan et al. | |
| 2006/0231183 A1 | 10/2006 | Serra et al. | |
| 2007/0112120 A1 | 5/2007 | Vasseur | |
| 2008/0103287 A1 | 5/2008 | Chino et al. | |
| 2008/0132644 A1 | 6/2008 | Lapra et al. | 525/105 |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-pain et al. | 525/190 |
| 2010/0016475 A1 | 1/2010 | Doering et al. | |
| 2010/0022714 A1 | 1/2010 | Varagniat et al. | 525/209 |
| 2011/0021702 A1 | 1/2011 | Gandon-Pain et al. | 525/55 |
| 2011/0098404 A1 | 4/2011 | Kwag et al. | 524/575 |
| 2011/0152458 A1 | 6/2011 | Araujo Da Silva et al. | |
| 2011/0306700 A1 | 12/2011 | Belin et al. | |
| 2012/0149806 A1 | 6/2012 | Kondo et al. | |
| 2012/0157575 A1 | 6/2012 | Ozawa et al. | 523/467 |
| 2012/0208948 A1 | 8/2012 | Gandon-Pain et al. | 524/521 |
| 2012/0225233 A1 | 9/2012 | Guy et al. | |
| 2013/0012652 A1 | 1/2013 | Araujo Da Silva et al. | |
| 2015/0299435 A1 | 10/2015 | Fleury et al. | C08L 7/00 |
| 2015/0322234 A1 | 11/2015 | Fleury et al. | C08K 3/36 |
| 2015/0337109 A1 | 11/2015 | Fleury et al. | C08K 3/36 |
| 2015/0368444 A1 | 12/2015 | Fleury et al. | C08L 7/00 |
| 2016/0108209 A1 | 4/2016 | Schnell et al. | C08K 5/3445 |
| 2016/0122504 A1 | 5/2016 | Schnell et al. | C08K 5/092 |
| 2016/0130418 A1 | 5/2016 | Schnell et al. | C08K 3/36 |
| 2016/0314992 A1* | 10/2016 | Sumita | C08G 59/42 |

FOREIGN PATENT DOCUMENTS

| | | |
|---|---|---|
| CN | 102307942 A | 1/2012 |
| CN | 102812079 A | 12/2012 |
| EP | 0 233 009 A2 | 8/1987 |
| EP | 0 247 580 A2 | 12/1987 |
| EP | 0 763 564 A1 | 3/1997 |
| EP | 0 763 564 A2 | 3/1997 |
| EP | 1 072 613 A1 | 1/2001 |
| EP | 1 403 287 A1 | 3/2004 |
| EP | 1 918 307 A2 | 5/2008 |
| EP | 2 447 318 A1 | 5/2012 |
| FR | 2 567 899 A1 | 1/1986 |
| FR | 2 946 050 A1 | 12/2010 |
| IT | 1245551 B | 9/1994 |
| JP | 06-183203 A | 7/1994 |
| JP | 7-304902 A | 11/1995 |
| JP | 09-012675 A | 1/1997 |
| JP | 2004-521772 A | 7/2004 |
| JP | 2004-359773 A | 12/2004 |
| JP | 2007230102 A | 9/2007 |
| JP | 2007-269658 A | 10/2007 |
| JP | 2012-184442 A | 9/2012 |
| JP | 2012-211122 | 11/2012 |
| JP | 2016-505673 A | 2/2016 |
| KR | 2003-0030592 A | 4/2003 |
| WO | 97/36724 A1 | 10/1997 |
| WO | 99/16600 A1 | 4/1999 |
| WO | 2001/096127 A1 | 12/2001 |
| WO | 02/10269 | 2/2002 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2014/191315 A1 | 12/2014 |

OTHER PUBLICATIONS

AZoM, "Ethylene Propylene Rubbers—Properties and Applications of Ethylene Propylene Diene (EPDM) and Ethylene Propylene Copolymers (EPM)", International Institute of Synthetic Rubber Producers, 3 pages (2003).

M. Pire et al., "Imidazole-promoted acceleration of crosslinking in epoxidized natural rubber/dicarboxylic acid blends," Polymer, vol. 52, No. 23, pp. 5243-5249 (2011).

M. Pire et al., "Epoxidized natural rubber/dicarboxylic acid self-vulcanized blends," Polymer, vol. 51, No. 25, pp. 5903-5909 (2010).

W. Chonkaew et al., "Mechanical and Tribological Properties of Epoxy Modified by Liquid Carboxyl Terminated Poly (butadiene-co-acrylonitrile) Rubber," Journal of Appl. Polymer Sci., vol. 125, No. 1, pp. 361-369 (2012).

Science of Synthesis, "12.3 Product Class 3: Imidazoles", 12, pp. 325-528 (2002).

A. El Mejjatti, et al., "Chemical recycling of poly(ethylene terephthalate). Application to the synthesis of multiblock copolyesters", eXPRESS Polymer Letters, vol. 8, No. 8, pp. 544-553 (2014).

R. Storey, et al., "New Epoxy-Terminated Oligoesters: Precursors to Totally Biodegradable Networks," Journal of Polymer Science: Part A: Polymer Chemistry, vol. 31, pp. 1825-1838 (1993).

N. Ahmad, et al., "Chain Transfer to Polymer in Free-Radical Solution Polymerization of N-Butyl Acrylate Studied by NMR Spectroscopy," Macromolecules, vol. 31, pp. 2822-2827 (1998).

J. Yu, et al., "Ultraviolet-Initiated Photografting of Glycidyl Methacrylate onto Styrene-Butadiene Rubber," Journal of Appl. Polymer Sci., vol. 73, pp. 1733-1739 (1999).

* cited by examiner

RUBBER COMPOSITION COMPRISING AN EPOXIDE ELASTOMER CROSS-LINKED BY A POLYCARBOXYLIC ACID

FIELD OF THE INVENTION

The present invention relates to rubber compositions, in particular to rubber compositions based on elastomers comprising epoxide functional groups.

RELATED ART

Furthermore, it is known, and has been normal for a great many years, to use, in tyres, rubber compositions having an elastomer matrix which is crosslinked with sulphur; this crosslinking is then known as vulcanization. The conventional vulcanization system combines molecular sulphur and at least one vulcanization accelerator. However, it is known that such a system is damaging to the processing of the composition before curing by the scorching phenomenon. It should be remembered that the "scorching" phenomenon rapidly results, during the preparation of the rubber compositions, in premature vulcanizations ("scorching"), in very high viscosities in the raw state, finally in rubber compositions which are virtually impossible to work and to process industrially.

Consequently, the vulcanization systems have been improved over the years, in combination with the processes for the preparation of the rubber compositions, in order to overcome the abovementioned disadvantages. Thus, the compositions are often complex and comprise, in addition to the molecular sulphur or an agent which donates molecular sulphur, vulcanization accelerators, activators and optionally vulcanization retardants. At present, it would be advantageous for manufacturers to find crosslinking systems which are as effective as vulcanization, while simplifying the compositions and their preparation.

On continuing their research studies, the Applicant Companies have previously found that specific compositions for tyres crosslinked by a polycarboxylic acid can be simplified, with respect to the conventional compositions, and that these compositions can exhibit improved properties. The Applicant Companies have now found that the use of an agent for covering silica in combination with a composition in which silica is predominant makes it possible to improve the breaking properties of these compositions.

BRIEF DESCRIPTION OF EMBODIMENTS OF THE INVENTION

Consequently, a first subject-matter of the invention is a rubber composition based on at least one predominant elastomer comprising epoxide functional groups, silica as predominant reinforcing filler, an agent for covering the silica and a system for crosslinking the said elastomer comprising a polycarboxylic acid of general formula (I):

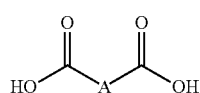

(I)

in which A represents a covalent bond or a hydrocarbon group comprising at least 1 carbon atom, optionally substituted and optionally interrupted by one or more heteroatoms, and an imidazole of general formula (II):

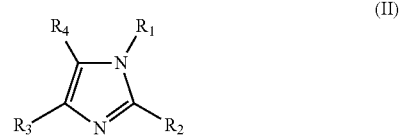

(II)

in which:
R$_1$ represents a hydrocarbon group or a hydrogen atom,
R$_2$ represents a hydrocarbon group,
R$_3$ and R$_4$ represent, independently of each other, a hydrogen atom or a hydrocarbon group,
or else R$_3$ and R$_4$ form, together with the carbon atoms of the imidazole ring to which they are attached, a ring.

Preferably, a subject-matter of the invention is a composition as defined above, in which the predominant diene elastomer comprising epoxide functional groups represents from 30 to 100 phr, preferably from 50 to 100 phr, as a blend with from 0 to 70 phr, preferably from 0 to 50 phr, of one or more minor non-epoxidized elastomers. Preferably, the predominant diene elastomer comprising epoxide functional groups represents all of the 100 phr of elastomer. Preferably, the predominant elastomer comprising epoxide functional groups exhibits a molar degree of epoxidation within a range extending from 0.1% to 80%, preferably within a range from 0.1% to 50% and more preferably within a range from 0.3% to 50%. More preferably, the predominant elastomer comprising epoxidized functional groups is selected from the group consisting of epoxidized diene elastomers, epoxidized olefinic elastomers and the mixtures of these. According to a first preferred embodiment, the predominant elastomer comprising epoxide functional groups is an epoxidized diene elastomer and preferably an epoxidized diene elastomer selected from the group consisting of epoxidized natural rubbers, epoxidized synthetic polyisoprenes, epoxidized polybutadienes, epoxidized butadiene-styrene copolymers and the mixtures of these. According to another embodiment, which is also preferred, the predominant elastomer comprising epoxide functional groups is an olefinic elastomer comprising epoxide functional groups, preferably comprising epoxide functional groups comprises between 50 and 95%, more preferably between 65 and 85%, of olefin (molar percentages). Preferably, the olefinic elastomer comprising epoxide functional groups is an epoxidized ethylenic elastomer.

Preferably also, the invention relates to a composition as defined above, in which A represents a covalent bond or a divalent hydrocarbon group comprising from 1 to 1800 carbon atoms, preferably from 2 to 300 carbon atoms, more preferably from 2 to 100 carbon atoms and better still from 2 to 65 carbon atoms. Preferably, A is a type of divalent group aliphatic or aromatic or a group comprising at least one aliphatic part and one aromatic part. More preferably, A is a divalent group of aromatic type or a group comprising at least one aliphatic part and one aromatic part, and more preferably still A is a divalent group of saturated or unsaturated aliphatic type; very preferably, A is an alkylene group. Preferably, A is interrupted by at least one heteroatom chosen from oxygen, nitrogen and sulphur, preferably oxygen. Preferably also, A is substituted by at least one radical chosen from alkyl, cycloalkylalkyl, aryl, aralkyl, hydroxyl, alkoxy, amino and carbonyl radicals. Preferably, A is substituted by one or more carboxylic acid functional groups and/or by one or more hydrocarbon radicals chosen from alkyl, cycloalkyl, cycloalkylalkyl, aryl or aralkyl radicals, themselves substituted by one or more carboxylic acid functional groups. Alternatively and preferably also, A does not comprise another carboxylic acid functional group. Preferably, the content of polyacid is within a range extending from 0.2 to 100 phr and preferably from 0.2 to 50 phr.

Preferably, the invention relates to composition as defined above, in which:

- $R_1$ represents a hydrogen atom or an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms, which group can optionally be interrupted by one or more heteroatoms and/or substituted,
- $R_2$ represents an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms, which group can optionally be interrupted by one or more heteroatoms and/or substituted,
- $R_3$ and $R_4$ independently represent identical or different groups chosen from hydrogen or alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted, or else $R_3$ and $R_4$ form, together with the carbon atoms of the imidazole ring to which they are attached, a ring chosen from aromatic, heteroaromatic or aliphatic rings comprising from 5 to 12 carbon atoms, preferably 5 or 6 carbon atoms.

More preferably, the invention relates to a composition as defined above, in which $R_1$ represents a group chosen from alkyl groups having from 2 to 12 carbon atoms or aralkyl groups having from 7 to 13 carbon atoms, which groups can optionally be substituted. Preferably, $R_1$ represents an optionally substituted aralkyl group having from 7 to 13 carbon atoms and $R_2$ represents an alkyl group having from 1 to 12 carbon atoms. Preferably, $R_1$ represents an optionally substituted aralkyl group having from 7 to 9 carbon atoms and $R_2$ represents an alkyl group having from 1 to 4 carbon atoms. More preferably, $R_3$ and $R_4$ independently represent identical or different groups chosen from hydrogen or alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted, or else $R_3$ and $R_4$ form, with the carbon atoms of the imidazole ring to which they are attached, a phenyl, cyclohexene or cyclopentene ring.

Preferably, the invention relates to a composition as defined above, in which the imidazole content is within a range extending from 0.01 to 4 molar equivalents and preferably from 0.01 to 3 molar equivalents, with respect to the carboxylic acid functional groups present on the polycarboxylic acid of general formula (I).

Preferably, the invention relates to a composition as defined above, in which the total content of reinforcing filler is within a range extending from 5 to 200 phr. Preferably, the silica content is within a range extending from 5 to 200 phr, preferably from 10 to 150 phr. Preferably, the reinforcing filler comprises carbon black in a minor amount, preferably at a content within a range extending from 0.1 to 100 phr, preferably from 0.1 to 30 phr. Alternatively and preferably also, the silica represents the reinforcing filler in its entirety.

Preferably, the invention relates to a composition as defined above, in which the agent for covering the silica is selected from the group consisting of hydroxylated or hydrolysable silanes, polyols, polyethers, amines, hydroxylated or hydrolysable polysiloxanes, guanidine derivatives, alkali metal or alkaline earth metal hydroxides, and the mixtures of such compounds. Preferably, the agent for covering the silica is selected from the group consisting of amines, guanidine derivatives, alkali metal or alkaline earth metal hydroxides, and the mixtures of such compounds; more preferably from the group consisting of primary amines, guanidine derivatives, alkali metal or alkaline earth metal hydroxides, and the mixtures of such compounds. Very preferably, the agent for covering the silica is diphenylguanidine or octadecylamine, more particularly diphenylguanidine. Preferably, the agent for covering the silica is present at a content within a range extending from 0.5 to 30 phr, preferably from 1 to 15 phr.

DETAILED DESCRIPTION

The invention also relates to a tyre comprising a composition as defined above, preferably as tread composition.

I. Tests

The rubber compositions are characterized after curing, as indicated below.

Tensile Tests

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation, the modulus used here being the nominal (or apparent) secant modulus measured in first elongation, calculated by reducing to the initial cross section of the test specimen. At second elongation (i.e. after an accommodation cycle at the extension rate provided for the measurement itself), the nominal secant modulus (or apparent stress, in MPa) is measured at 10% elongation (denoted by ASM10) or 50% elongation (denoted by ASM50). The tensile measurements for determining the breaking stresses (in MPa) and the elongations at break (in %) and the accommodated secant moduli are carried out at a given temperature (usually 23° C. or 40° C.+/−2° C.) and under standard hygrometry conditions (50+/−5% relative humidity). These values can be converted into base 100 for facilitated comparison of the results.

II. Composition of the Invention

The composition according to the invention is a rubber composition based on at least one predominant elastomer comprising epoxide functional groups, at least one reinforcing filler and a system for crosslinking the said polymer comprising a specific polycarboxylic acid of general formula (I) and an imidazole of general formula (II).

The expression composition "based on" should be understood as meaning a composition comprising the mixture and/or the reaction product of the various constituents used, some of these base constituents being capable of reacting, or intended to react, with one another, at least in part, during the various phases of manufacture of the composition, in particular during the crosslinking or vulcanization thereof.

The expression "molar equivalent", which is well known to a person skilled in the art, should be understood as meaning the quotient of the number of moles of the compound concerned to the number of moles of the reference compound. Thus, 2 equivalents of a compound B with respect to a compound A represent 2 mol of the compound B when 1 mol of the compound A is used.

When reference is made to a "predominant" compound, this is understood to mean, within the meaning of the present invention, that this compound is predominant among the compounds of the same type in the composition, that is to say that it is the one which represents the greatest amount by weight among the compounds of the same type. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant within the meaning of the present invention and, in a system comprising two polymers, the predominant polymer represents more than half of the weight of the polymers.

On the contrary, a "minor" compound is a compound which does not represent the greatest fraction by weight among the compounds of the same type.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

II.1. Elastomer Comprising Epoxide Functional Groups (or Epoxidized Elastomer)

Elastomer or rubber (the two terms being in a known way synonymous and interchangeable) comprising epoxide functional groups is understood to mean any type of elastomer within the meaning known to a person skilled in the art, whether a homopolymer or a block, statistical or other copolymer, having elastomeric properties, which is epoxide-functionalized (or epoxidized), that is to say bears epoxide functional groups.

The degree (mol %) of epoxidation of the epoxidized elastomers can vary to a great extent according to the specific embodiments of the invention, preferably within a range from 0.1% to 80%, preferably within a range from 0.1% to 50% and more preferably within a range from 0.3% to 50%. When the degree of epoxidation is less than 0.1%, there is a risk of the targeted technical effect being insufficient whereas, above 80%, the intrinsic properties of the polymer are degraded. For all these reasons, the degree of functionalization, in particular of epoxidation, is more preferably within a range from 0.3% to 30%, better still within a range from 0.3% to 20%.

The epoxidized elastomers are in a known way solid at ambient temperature (20° C.); solid is understood to mean any substance not having the ability to eventually assume, at the latest after 24 hours, solely under the effect of gravity and at ambient temperature (20° C.), the shape of the container in which it is present.

The Tg of the elastomers described below is measured in a known way by DSC (Differential Scanning Calorimetry), for example and unless specifically indicated otherwise in the present patent application according to Standard ASTM D3418 of 1999.

The epoxidized elastomer can be selected from the group consisting of epoxidized diene elastomers, epoxidized olefinic elastomers and the mixtures of these. Preferably, the epoxidized elastomer is chosen from epoxidized olefinic elastomers and the mixtures of these. According to another preferred alternative form of the invention, the epoxidized elastomer is chosen from epoxidized diene elastomers and the mixtures of these.

It should be remembered that elastomer of the epoxidized diene type should be understood as meaning an elastomer which results at least in part (i.e., a homopolymer or a copolymer) from diene monomers (monomers bearing two conjugated or non-conjugated carbon-carbon double bonds), this polymer being functionalized, that is to say that it bears epoxide functional groups.

A first characteristic of epoxidized diene elastomers is thus that of being diene elastomers. These diene elastomers, by definition non-thermoplastic in the present patent application, exhibiting a Tg which in the very great majority of cases is negative (that is to say, less than 0° C.), can be categorized in a known way into two categories: those referred to as "essentially unsaturated" and those referred to as "essentially saturated". Butyl rubbers, such as, for example, copolymers of dienes and of α-olefins of EPDM type, come within the category of essentially saturated diene elastomers, having a content of units of diene origin which is low or very low, always less than 15% (mol %). In contrast, essentially unsaturated diene elastomer is understood to mean a diene elastomer resulting at least in part from conjugated diene monomers, having a content of units of diene origin (conjugated dienes) which is greater than 15% (mol %). In the category of "essentially unsaturated" diene elastomers, a "highly unsaturated" diene elastomer is understood in particular to mean a diene elastomer having a content of units of diene origin (conjugated dienes) which is greater than 50%.

It is preferable to use at least one diene elastomer of the highly unsaturated type, in particular a diene elastomer selected from the group consisting of natural rubber (NR), synthetic polyisoprenes (IRs), polybutadienes (BRs), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs) and the mixtures of such copolymers.

The above diene elastomers can, for example, be block, statistical, sequential or microsequential elastomers and can be prepared in dispersion or in solution; they can be coupled and/or star-branched or else functionalized with a coupling and/or star-branching or functionalization agent.

The following are preferably suitable: polybutadienes and in particular those having a content of 1,2-units of between 4% and 80% or those having a content of cis-1,4-units of greater than 80%, polyisoprenes, butadiene/styrene copolymers and in particular those having a styrene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers and in particular those having an isoprene content of between 5% and 90% by weight and a glass transition temperature from −40° C. to −80° C., or isoprene/styrene copolymers and in particular those having a styrene content of between 5% and 50% by weight and a Tg of between −25° C. and −50° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer having a Tg of between −20° C. and −70° C., are suitable in particular.

A second essential characteristic of the epoxidized diene elastomer of use for the requirements of the invention is that it is functionalized, bearing epoxide functional groups.

The epoxide functional groups present in the diene elastomer are obtained by copolymerization or by post-polymerization modification and will either be borne directly by the backbone of the chain or will be borne by a side group, depending on the method of preparation, for example by epoxidation or any other modification of the diene functional groups present in the elastomeric chain after copolymerization.

The epoxidized diene elastomers can, for example, be obtained in a known way by epoxidation of the equivalent non-epoxidized diene elastomer, for example by processes based on chlorohydrin or on bromohydrin or processes based on hydrogen peroxides, on alkyl hydroperoxides or on peracids (such as peracetic acid or performic acid); see in particular *Kautsch. Gummi Kunstst.*, 2004, 57(3), 82. The epoxide functional groups are then in the polymer chain. Mention may in particular be made of epoxidized natural rubbers (abbreviated to "ENRs"); such ENRs are, for example, sold under the names "ENR-25" and "ENR-50" (respective degrees of epoxidation of 25% and 50%) by Guthrie Polymer. Epoxidized BRs are themselves also well known, for example sold by Sartomer under the name "Poly Bd" (for example, "Poly Bd 605E"). Epoxidized SBRs can be prepared by epoxidation techniques well known to a person skilled in the art.

Such epoxidized diene elastomers and their processes of preparation are well known to a person skilled in the art and are commercially available. Diene elastomers bearing epoxide groups have been described, for example, in US 2003/120007 or EP 0 763 564, and U.S. Pat. No. 6,903,165 or EP 1 403 287.

Preferably, the epoxidized diene elastomer is selected from the group consisting of epoxidized natural rubbers (NRs) (abbreviated to "ENRs"), epoxidized synthetic polyisoprenes (IRs), epoxidized polybutadienes (BRs) preferably having a content of cis-1,4-bonds of greater than 90%, epoxidized butadiene/styrene copolymers (SBRs) and the mixtures of these elastomers.

The epoxidized diene elastomers can also exhibit pendant epoxide functional groups. In this case, they can be obtained either by post-polymerization modification (see, for example, *J. Appl. Polym. Sci.*, 1999, 73, 1733); or by radical copolymerization of the diene monomers with monomers bearing epoxide functional groups, in particular methacrylate esters comprising epoxide functional groups, such as, for example, glycidyl methacrylate (this radical polymerization, in particular in bulk, in solution or in dispersed medium—in particular dispersion, emulsion or suspension—is well known to a person skilled in the art of the synthesis of polymers; mention may be made, for example, of the following reference: *Macromolécules*, 1998, 31, 2822). For example, the document US20110098404 describes the emulsion copolymerization of 1,3-butadiene, styrene and glycidyl methacrylate.

The degree (mol %) of epoxidation of the epoxidized diene elastomers described above can vary to a great extent according to the specific embodiments of the invention, preferably within a range from 0.1% to 80%, preferably within a range from 0.1% to 50% and more preferably within a range from 0.3% to 50%. When the degree of epoxidation is less than 0.1%, there is a risk of the targeted technical effect being insufficient whereas, above 80%, the intrinsic properties of the polymer are degraded. For all these reasons, the degree of functionalization, in particular of epoxidation, is more preferably within a range from 0.3% to 30%.

It should be remembered that elastomer of the epoxidized olefinic type should be understood as meaning an epoxide-functionalized elastomer, that is to say that it bears epoxide functional groups, and the elastomeric chain of which is a carbon chain predominantly comprising olefin monomer units denoted O (molar content greater than 50%). More specifically, the molar content of O is between 50 and 95%, preferably between 65 and 85%. This olefinic elastomer is thus a copolymer also comprising from 5 to 50 mol % of non-olefinic units, that is to say units other than O). These non-olefinic units are composed, partially or completely, of units bearing epoxide functional groups, denoted R, necessary for the requirements of the invention. In the case where not all the non-olefinic units are R units, other units, denoted A', are present in the carbon chain in such a way that the molar content of R+A' is strictly less than 50%.

The monomers O can originate from any olefin known to a person skilled in the art, such as, for example, ethylene, propylene, butylene or isobutylene, these monomers optionally being substituted by linear or branched alkyl groups.

Preferably, O is an ethylene [—$CH_2$—$CH_2$—] unit and, in this preferred case, the epoxidized olefinic elastomer is an epoxidized ethylenic elastomer, which makes it possible to even further improve the compromise between the stiffness and hysteresis performances in the tyre compositions.

An essential characteristic of the epoxidized olefinic elastomer of use for the requirements of the invention is that it is functionalized, bearing epoxide functional groups.

The epoxide functional group can be borne directly by the carbon backbone and is then mainly obtained by epoxidation of carbon-carbon double bonds initially present after copolymerization. This epoxidation of unsaturated polymers is well known to a person skilled in the art and can be carried out, for example, by processes based on chlorohydrin or bromohydrin, direct oxidation processes or processes based on hydrogen peroxides, on alkyl hydroperoxides or on peracids (such as peracetic acid or performic acid).

The epoxide functional group can also be pendant and is then either already present in a monomer involved in the copolymerization with the olefin (this monomer can, for example, be glycidyl methacrylate, allyl glycidyl ether or vinyl glycidyl ether) or obtained by the post-copolymerization modification of a pendant functional group.

The content (mol %) of R units of the epoxidized olefinic elastomers described above can vary to a great extent according to the specific embodiments of the invention, preferably within a range from 0.1% to 50%, preferentially within a range from 0.3% to 50%, more preferentially within a range from 0.3% to 30% and better still within a range from 0.3% to 20%. When the content of R units is less than 0.1%, there is a risk of the targeted technical effect being insufficient whereas, above 50%, the elastomer would no longer be predominantly olefinic.

When the non-olefinic units are not composed entirely of R units bearing an epoxide functional group, other non-olefinic units A' are present in the chain, so that the total molar content represented by the monomers O, R and A' is equal to 100%. The non-olefinic monomers of use in the preparation of the epoxidized olefinic elastomers can be chosen from non-olefinic monomers not resulting in unsaturations and monomers which, once polymerized, result in unsaturations borne by the elastomer chain (other than diene monomers).

The non-olefinic monomers not resulting in unsaturations are essentially vinyl and acrylic/methacrylic monomers. For example, such monomers can be chosen from styrene, vinyl acetate, vinyl alcohol, acrylonitrile, methyl acrylate or methyl methacrylate, these monomers optionally being substituted by alkyl or aryl groups or other functionalized groups.

For example also, the non-diene monomers of use in the preparation of the elastomers of the type of olefinic elastomers bearing unsaturations by copolymerization are all those known to a person skilled in the art for forming unsaturated elastomers, such as, for example, dicyclopentadienyloxyethyl methacrylate.

The epoxidized olefinic elastomers exhibit a Tg which in the very great majority of cases is negative (that is to say, less than 0° C.).

The epoxidized olefinic elastomers exhibit a number-average molar mass ($M_n$) of at least 10 000 g/mol, preferably of at least 15 000 g/mol, and of at most 1 500 000 g/mol. The polydispersity index PI, equal to $M_w/M_n$ ($M_w$ being the weight-average molar mass), is between 1.05 and 11.00.

Preferably, and to sum up, the olefinic elastomer comprising epoxide functional groups is thus a copolymer having at least 50% (in moles) of olefin monomer units and with a number of different monomer units of greater than or equal to 2, preferably from 2 to 5 and more preferably 2 or 3. This copolymer can be obtained by copolymerization or by post-polymerization modification of an elastomer. The epoxide functional groups present in the olefinic copolymer, obtained by copolymerization or by post-polymerization modification, will either be borne directly by the backbone of the chain or will be borne by a side group, depending on the method of preparation, for example by epoxidation or any other modification of the diene functional groups present in the elastomeric chain after copolymerization.

Epoxidized olefinic elastomers and their processes of preparation are well known to a person skilled in the art and are commercially available. Olefinic elastomers bearing epoxide groups have been described, for example, in the documents EP 0 247 580 and U.S. Pat. No. 5,576,080. Also, Arkema commercially provides epoxidized polyethylenes under the trade names Lotader AX8840 and Lotader AX8900.

The compositions of the invention can comprise just one epoxidized elastomer or a mixture of several epoxidized elastomers (which will then be noted in the singular as being "the epoxidized elastomer" in order to represent the sum of the epoxidized elastomers of the composition).

The epoxidized elastomer is predominant in the rubber composition of the invention, that is to say that it is either the only elastomer or it is that which represents the greatest weight among the elastomers of the composition.

According to a preferred embodiment of the invention, the rubber composition comprises, for example, from 30 to 100 phr, in particular from 50 to 100 phr and preferably from 70 to 100 phr of a predominant epoxidized elastomer as a blend with from 0 to 70 phr, in particular from 0 to 50 phr and preferably from 0 to 30 phr of one or more other non-epoxidized minor elastomers.

According to another preferred embodiment of the invention, the composition comprises, for the whole of the 100 phr of elastomer, one or more epoxidized elastomers.

II.2. Reinforcing Filler

The rubber composition according to the invention comprises silica as predominant reinforcing filler. In addition, other reinforcing fillers can be used, such as carbon black.

The physical state in which the silica is provided is not important, whether it is in the form of a powder, of micropearls, of granules, of beads or any other appropriate densified form. The silica used can be any reinforcing silica known to a person skilled in the art, in particular any precipitated or fumed silica exhibiting a BET specific surface and a CTAB specific surface which are both less than 450 m²/g, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837. The silica preferably has a BET specific surface of between 45 and 400 m²/g, more preferably of between 60 and 300 m²/g.

All carbon blacks, in particular blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

Preferably, the content of total reinforcing filler (silica and optionally, carbon black and/or another reinforcing filler) is within a range extending from 5 to 200 phr, more preferably from 10 to 150 phr, the optimum being, in a known way, different depending on the specific applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy-duty vehicle.

Preferably, use is made of silica, which is always predominant, at a content ranging from 5 to 200 phr, more preferably from 10 to 150 phr; and optionally of carbon black. The carbon black, when it is present, is preferably used at a content of less then 100 phr, more preferably within a range extending from 0.1 to 100 phr, more preferably from 0.1 to 30 phr, in particular from 0.1 to 10 phr, and better still from 0.1 to 5 phr.

In order to couple the reinforcing inorganic filler to the elastomer, use may be made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

In the compositions of the invention, the content of coupling agent is preferably within a range extending from 0 to 20 phr, more preferably from 0 to 16 phr and more preferably still from 0 to 12 phr.

A person skilled in the art will understand that, as filler equivalent to the reinforcing inorganic filler described in the present section, a reinforcing filler of another nature, in particular organic nature, might be used provided that this reinforcing filler is covered with an inorganic layer, such as silica, or else comprises functional sites, in particular hydroxyl sites, at its surface requiring the use of a coupling agent in order to form the bond between the filler and the elastomer.

II.3. Agent for Covering the Silica

The composition of the invention comprises at least one agent for covering the silica, such as the agents known to a person skilled in the art. Preferably, the agent for covering the silica is selected from the group consisting of hydroxylated or hydrolysable silanes, polyols, polyethers, amines, hydroxylated or hydrolysable polysiloxanes, guanidine derivatives, alkali metal or alkaline earth metal hydroxides and the mixtures of such compounds; more preferably from the group consisting of amines, guanidine derivatives, alkali metal or alkaline earth metal hydroxides and the mixtures of such compounds; preferably from the group consisting of primary amines, guanidine derivatives, alkali metal or alkaline earth metal hydroxides and the mixtures of such compounds; and very preferably the agent for covering the silica is diphenylguanidine or octadecylamine, more particularly diphenylguanidine.

Preferably, the agent for covering the silica is present at a content within a range extending from 0.5 to 30 phr, preferably from 1 to 15 phr.

II.4. System for Crosslinking the Epoxidized Polymer

The epoxidized polymer and the reinforcing filler described above are combined with a crosslinking system capable of crosslinking it or curing the composition of the invention. This crosslinking system comprises a (that is to say, at least one) specific polycarboxylic acid of general formula (I) and an (that is to say, at least one) imidazole of general formula (II).

II.4.a. Polyacid

The polyacid of use for the requirements of the invention is a polycarboxylic acid of general formula (I):

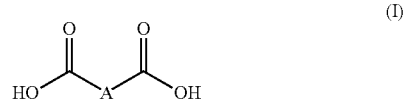

(I)

in which A represents a covalent bond or a hydrocarbon group comprising at least 1 carbon atom, optionally substituted and optionally interrupted by one or more heteroatoms.

Preferably, in the polyacid of general formula (I), A represents a covalent bond or a divalent hydrocarbon group comprising from 1 to 1800 carbon atoms, preferably from 2 to 300 carbon atoms, more preferably from 2 to 100 carbon atoms and very preferably from 2 to 65 carbon atoms. Above 1800 carbon atoms, the polyacid is a less effective crosslinking agent. Thus, A preferably represents a divalent hydrocarbon group comprising from 3 to 65 carbon atoms preferably from 5 to 65 carbon atoms more preferably from 8 to 65 carbon atoms and more preferably still from 10 to 65 carbon atoms.

Preferably, in the polyacid of general formula (I), A can be a divalent group of aliphatic or aromatic type or a group comprising at least one aliphatic part and one aromatic part. Preferably, A can be a divalent group of aliphatic type or a group comprising at least one aliphatic part and one aromatic part. Alternatively and preferably also, A can be a divalent group of saturated or unsaturated aliphatic type, for example an alkylene group.

The group A of the polyacid of general formula (I) can be interrupted by at least one heteroatom chosen from oxygen, nitrogen and sulphur, preferably oxygen.

Also, the group A of the polyacid of general formula (I) can be substituted by at least one radical chosen from alkyl, cycloalkylalkyl, aryl, aralkyl, hydroxyl, alkoxy, amino and carbonyl radicals.

The polyacid of general formula (I) can comprise more than two carboxylic acid functional groups; in this case, the group A is substituted by one or more carboxylic acid functional groups and/or by one or more hydrocarbon radicals chosen from alkyl, cycloalkyl, cycloalkylalkyl, aryl or aralkyl radicals, themselves substituted by one or more carboxylic acid functional groups.

According to a preferred form, the radical A does not comprise another carboxylic acid functional group; the polyacid is thus a diacid.

The content of polyacid is preferably within a range extending from 0.2 to 100 phr, preferably from 0.2 to 50 phr, more preferably from 0.4 to 27 phr and more preferably still from 0.9 to 25 phr. Below 0.2 phr of polyacid, the effect of the crosslinking is not substantial, whereas, above 100 phr of polyacid, the polyacid, the crosslinking agent, becomes predominant by weight with respect to the polymeric matrix.

The polyacids of use for the requirements of the invention are either commercially available or easily prepared by a person skilled in the art according to well-known techniques, such as the chemical routes described, for example, in the document U.S. Pat. No. 7,534,917 and in the references cited by this document, or biological routes, such as the fermentation described in the document U.S. Pat. No. 3,843,466.

For example, mention may be made, as polyacids which are commercially available and of use for the requirements of the invention, of: oxalic acid, succinic acid, adipic acid, sebacic acid, dodecanedioic acid, terephthalic acid or else polyacids, such as trimesic acid or 3,4-bis(carboxymethyl) cyclopentanecarboxylic acid. Among the diacids of higher weight, mention may be made of polybutadiene, dicarboxy terminated (Aldrich, CAS 68891-79-2), poly(acrylonitrile-co-butadiene), dicarboxy terminated (Aldrich, CAS 68891-46-3), poly(ethylene oxide), 4-arm, carboxylic acid terminated (Aldrich), poly(ethylene glycol) bis(carboxymethyl) ether (Aldrich, CAS 39927-08-7), polybutadiene, dicarboxy terminated (Sartomer, "Krasol LBM32") or else commercial polyesters, such as those cited in the following documents: JP05062890, CN1247198 or else J. Polym. Sci. Part A, 1993, 31, 1825.

II.4.b. Imidazole

The imidazole of use for the crosslinking system according to the invention is an imidazole of general formula (II):

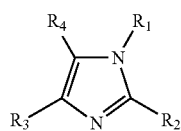

(II)

in which:
- R₁ represents a hydrocarbon group or a hydrogen atom,
- R₂ represents a hydrocarbon group,
- R₃ and R₄ represent, independently of each other, a hydrogen atom or a hydrocarbon group,
- or else R₃ and R₄ form, together with the carbon atoms of the imidazole ring to which they are attached, a ring.

Preferably, the imidazole of general formula (II) has groups such that:
- R₁ represents a hydrogen atom or an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms, which group can optionally be interrupted by one or more heteroatoms and/or substituted,
- R₂ represents an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms, which group can optionally be interrupted by one or more heteroatoms and/or substituted,
- R₃ and R₄ independently represent identical or different groups chosen from hydrogen or alkyl groups having from 1 to 20 carbon atoms, cycloalkyl groups having from 5 to 24 carbon atoms, aryl groups having from 6 to 30 carbon atoms or aralkyl groups having from 7 to 25 carbon atoms, which groups can optionally be interrupted by heteroatoms and/or substituted, or else R₃ and R₄ form, together with the carbon atoms of the imidazole ring to which they are attached, a ring chosen from aromatic, heteroaromatic or aliphatic rings comprising from 5 to 12 carbon atoms, preferably 5 or 6 carbon atoms.

Preferably, R₁ represents a group chosen from alkyl groups having from 2 to 12 carbon atoms or aralkyl groups having from 7 to 13 carbon atoms, which groups can optionally be substituted. More preferably, R₁ represents an optionally substituted aralkyl group having from 7 to 13 carbon atoms and R₂ represents an alkyl group having from 1 to 12 carbon atoms. More preferably still, R₁ represents an optionally substituted aralkyl group having from 7 to 9 carbon atoms and R₂ represents an alkyl group having from 1 to 4 carbon atoms.

Preferably, R₃ and R₄ independently represent identical or different groups chosen from hydrogen or alkyl groups having from 1 to 12 carbon atoms, cycloalkyl groups having from 5 to 8 carbon atoms, aryl groups having from 6 to 24 carbon atoms or aralkyl groups having from 7 to 13 carbon atoms, which groups can optionally be substituted. Alternatively and preferably also, R₃ and R₄ represent form, with the carbon atoms of the imidazole ring to which they are attached, a phenyl, cyclohexene or cyclopentene ring.

For satisfactory operation of the invention, the imidazole content is preferably within a range extending from 0.01 to 4 molar equivalents and preferably from 0.01 to 3 molar equivalents, with respect to the carboxylic acid functional groups present on the polycarboxylic acid of general formula (I). Below 0.01 molar equivalent, no effect of the imidazole coagent is observed in comparison with the situation where the polyacid is used alone, whereas, above a value of 4 molar equivalents, no additional benefit is observed in comparison with lower contents. Thus, the imidazole content is more preferably within a range extending from 0.01 to 2.5 molar equivalents, preferably from 0.01 to 2 molar equivalents and more preferably still from 0.01 to 1.5 molar equivalents, with respect to the carboxylic acid functional groups present on the polycarboxylic acid of general formula (I).

The imidazoles of use for the requirements of the invention are either commercially available or are easily prepared by a person skilled in the art according to well-known techniques, such as described, for example, in the documents JP2012211122 and JP2007269658 or also in *Science of Synthesis*, 2002, 12, 325-528.

For example, mention may be made, as imidazoles which are commercially available and which are of use for the requirements of the invention, of 1,2-dimethylimidazole, 1-decyl-2-methylimidazole or 1-benzyl-2-methylimidazole.

II.4.c. Polyacid and Imidazole

Obviously and in accordance with the definition of the expression "based on" for the present invention, a composition based on the polyacid of general formula (I) and on the imidazole of general formula (II) which are presented above might be a composition in which the said polyacid and the said imidazole have reacted together beforehand to form a salt between one or more acid functional groups of the polyacid and respectively one or more imidazole nuclei.

II.5. Various Additives

The rubber compositions of the invention can also comprise all or a portion of the usual additives generally used in elastomer compositions intended for the manufacture of treads, such as, for example, pigments, protection agents, such as antiozone waxes, chemical antiozonants or antioxidants, antifatigue agents, crosslinking agents other than those mentioned above, reinforcing resins or plasticizing agents. Preferably, this plasticizing agent is a solid hydrocarbon resin (or plasticizing resin), an extending oil (or plasticizing oil) or a mixture of the two.

Preferably, the compositions of the invention are devoid of a crosslinking system other than that described above and which comprises at least one polyacid and at least one imidazole. In other words, the crosslinking system based on at least one polyacid and at least one imidazole is preferably the only crosslinking system in the composition of the invention. Preferably, the compositions of the invention are devoid of a vulcanization system or comprise less than 1 phr, preferably less than 0.5 phr and more preferably less than 0.2 phr thereof. Thus, the composition of the invention is preferably devoid of molecular sulphur or comprises less than 1 phr, preferably less than 0.5 phr and more preferably less than 0.2 phr thereof. Likewise, the composition is preferably devoid of any vulcanization accelerator as known to a person skilled in the art or comprises less than 1 phr, preferably less than 0.5 phr and more preferably less than 0.2 phr thereof.

II.6. Process for the Preparation of the Compositions of the Invention

The rubber compositions can be manufactured in appropriate mixers, using two successive phases of preparation well known to a person skilled in the art: a first phase of thermomechanical working or kneading ("non-productive" phase) at high temperature, up to a maximum temperature of between 90° C. and 190° C., preferably from 100° C. to 135° C., optionally followed by a second phase of mechanical working ("productive" phase) down to a lower temperature, typically of less than 110° C., for example between 40° C. and 100° C., during which finishing phase the crosslinking system can be incorporated.

The compositions are thus prepared by a process including a phase (or stage) of thermomechanical working or kneading during which at least the epoxidized elastomer, the reinforcing filler, the optional additives other than the polyacid and the imidazole, and optionally the polyacid and the imidazole are introduced, up to a maximum temperature of between 90° C. and 190° C., preferably within a range extending from 100° C. to 135° C., at which temperature the kneading is halted.

Preferably, the process for the preparation of the compositions of the invention does not comprise any phase of thermomechanical kneading at a temperature of greater than 135° C.

According to a first embodiment, which is preferred, the polyacid and imidazole are added to the composition during the first working phase described above; in this case, the process for the preparation of the compositions of the invention can be a process in a single compounding stage.

Preferably, according to this first embodiment, the ingredients are introduced in the following order: the epoxidized elastomer, the reinforcing filler, the optional additives other than the polyacid and the imidazole, the polyacid and the imidazole.

According to a second embodiment, which is also preferred, if only the polyacid or the imidazole is added to the composition during the first kneading phase, or also if neither of the two is added during this stage, they are added during a subsequent stage.

Thus, according to the second embodiment, the preparation comprises a subsequent phase of mechanical working ("productive" phase) during which the crosslinking system is completed (if only the polyacid or the imidazole was added during the first working phase) or incorporated (if neither polyacid nor imidazole was added during the first working phase) and kneaded, down to a lower temperature, that is to say of less than 110° C., preferably between 40° C. and 100° C., at which temperature the kneading is halted.

It is understood that the second embodiment includes three alternative forms in the time of the addition of the ingredients of the crosslinking system: the case where the polyacid is introduced during the first working phase and the imidazole is introduced during the subsequent "productive" working phase; the case where the imidazole is introduced during the first working phase and the polyacid is introduced during the subsequent working phase; and finally the case where the polyacid and the imidazole are introduced during the "productive" working phase.

The composition thus obtained can subsequently be calendered, for example in the form of a sheet or of a plaque, in particular for laboratory characterization, or also extruded, for example to form a rubber profiled element, such as, for example, a tread, which can be used in the manufacture of a tyre.

II.7. Use in Tyres

The rubber composition obtained can, for example, be used in different parts of the said tyre, in particular in the crown, the area of the bead, the area of the sidewall and the tread (in particular in the underlayer of the tread).

According to a preferred embodiment of the invention, the rubber composition described above can be used in the tyre as an elastomer layer in at least one part of the tyre.

Elastomer "layer" is understood to mean any three-dimensional component, made of rubber (or "elastomer", the two being regarded as synonyms) composition, having any shape and any thickness, in particular sheet, strip or other component having any cross section, for example rectangular or triangular.

First of all, the elastomer layer can be used as tread underlayer positioned in the crown of the tyre between, on the one hand, the tread, i.e. the portion intended to come into contact with the road during running, and, on the other hand, the belt reinforcing the said crown. The thickness of this elastomer layer is preferably within a range extending from 0.5 to 10 mm, in particular within a range from 1 to 5 mm.

According to another preferred embodiment of the invention, the rubber composition of the invention can be used to form an elastomer layer positioned in the region of the area of the bead of the tyre, radially between the carcass ply, the bead wire and the turn-up of the carcass ply.

Equally, the composition of the invention can be used in the plies of the crown (tyre belt) or in the area between the ends of the plies of the crown and the carcass ply.

Another preferred embodiment can be the use of the composition of the invention to form an elastomer layer positioned in the area of the sidewall of the tyre.

Alternatively, the composition of the invention can advantageously be used in the tread of the tyre.

The tyres in which the composition of the invention can be used are in particular intended for passenger vehicles as well as for two-wheel vehicles (motorcycles, bicycles), industrial vehicles chosen from vans, "heavy-duty vehicles", i.e. underground, bus, heavy road transport vehicles (lorries, tractors, trailers) or off-road vehicles, heavy agricultural vehicles or earthmoving equipment, planes, and other transportation or handling vehicles. The invention and its advantages will be easily understood in the light of the description and implementational examples which follow.

III. Implementational Examples of the Invention

The compositions in accordance with the invention (C2 and C3) and the control composition (C1) were prepared as indicated above are presented in table 1 below.

TABLE 1

|  | C1 | C2 | C3 |
|---|---|---|---|
| EPOXPE (1) | 100 | 100 | 100 |
| Silica (2) | 45 | 45 | 45 |
| Polyacid (3) | 24.7 | 24.7 | 24.7 |
| Imidazole (4) | 1.6 | 1.6 | 1.6 |
| Covering agent (5) | — | 2.2 | 7.4 |

(1) EPOXPE: epoxidized polyethylene, Lotader AX8900 from Arkema, comprising 8% of glycidyl methacrylate, 24% of methyl acrylate and 68% of ethylene;
(2) Silica 160 MP, Zeosil 1165 MP from Rhodia;
(3) Poly(acrylonitrile-co-butadiene), dicarboxy terminated, CAS 68891-46-3, from Aldrich, M = 3800 g/mol;
(4) 1-Benzyl-2-methylimidazole, CAS = 13750-62-4, from Sigma-Aldrich;
(5) Diphenylguanidine, Perkacit DPG from Flexsys.

The properties of compositions C1 to C3 were measured as indicated above and the results are shown in table 2 below.

TABLE 2

|  | C1 | C2 | C3 |
|---|---|---|---|
| ASM50 at 23° C. (base 100) | 100 | 100 | 88 |
| Elongation at break at 23° C. (base 100) | 100 | 113 | 140 |
| Breaking stress at 23° C. (base 100) | 100 | 113 | 103 |

A very marked improvement in the breaking properties of the compositions is noted in the compositions of the invention, in comparison with the same composition prepared without covering agent. Furthermore, in the compositions, it may be noted that the replacement of the conventional vulcanization system by a polyacid and imidazole crosslinking system, as prescribed for the invention, makes it possible to be freed from the known disadvantages of the systems with sulphur.

The invention claimed is:

1. A rubber composition based on:
   at least one elastomer comprising epoxide functional groups,
      wherein the predominant elastomer in the rubber composition is an elastomer comprising epoxide functional groups,
   silica as predominant reinforcing filler,
   an agent for covering the silica, and
   a system for crosslinking the predominant elastomer comprising:
      a polycarboxylic acid of general formula (I):

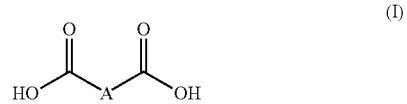

in which A represents a covalent bond or a hydrocarbon group comprising at least one carbon atom, optionally substituted and optionally interrupted by one or more heteroatoms, and
   an imidazole of general formula (II):

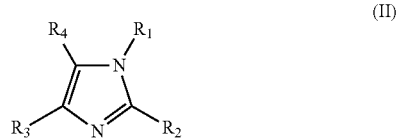

in which:
   $R_1$ represents a hydrocarbon group or a hydrogen atom,
   $R_2$ represents a hydrocarbon group,
   $R_3$ and $R_4$ represent, independently of each other, a hydrogen atom or a hydrocarbon group, or else $R_3$ and $R_4$ form, together with the carbon atoms of the imidazole ring to which they are attached, a ring.

2. The rubber composition according to claim 1, wherein the at least one elastomer comprising epoxide functional groups represents from 30 to 100 phr as a blend with from 0 to 70 phr of one or more minor non-epoxidized elastomers.

3. The rubber composition according to claim 2, wherein the at least one elastomer comprising epoxide functional groups represents from 50 to 100 phr as a blend with from 0 to 50 phr of one or more minor non-epoxidized elastomers.

4. The rubber composition according to claim 1, wherein the at least one elastomer comprising epoxide functional groups represents all of the 100 phr of elastomer.

5. The rubber composition according to claim 1, wherein the at least one elastomer comprising epoxide functional groups exhibits a molar degree of epoxidation within a range extending from 0.1% to 80%.

6. The rubber composition according to claim 5, wherein the at least one elastomer comprising epoxide functional groups exhibits a molar degree of epoxidation within a range extending from 0.1% to 50%.

7. The rubber composition according to claim 6, wherein the at least one elastomer comprising epoxide functional groups exhibits a molar degree of epoxidation within a range extending from 0.3% to 50%.

8. The rubber composition according to claim 1, wherein the at least one elastomer comprising epoxidized functional groups is selected from the group consisting of epoxidized diene elastomers, epoxidized olefinic elastomers and mixtures thereof.

9. The rubber composition according to claim 8, wherein the at least one elastomer comprising epoxide functional groups is an epoxidized diene elastomer.

10. The rubber composition according to claim 9, wherein the at least one elastomer comprising epoxide functional groups is an epoxidized diene elastomer selected from the group consisting of epoxidized natural rubbers, epoxidized synthetic polyisoprenes, epoxidized polybutadienes, epoxidized butadiene-styrene copolymers and mixtures thereof.

11. The rubber composition according to claim 8, wherein the at least one elastomer comprising epoxide functional groups is an epoxidized olefinic elastomer.

12. The rubber composition according to claim 11, wherein the epoxidized olefinic elastomer comprises between 50 and 95% of olefin (molar percentages).

13. The rubber composition according to claim 12, wherein the epoxidized olefinic elastomer comprises between 65 and 85% of olefin (molar percentages).

14. The rubber composition according to claim 11, wherein the epoxidized olefinic elastomer is an epoxidized ethylenic elastomer.

15. The rubber composition according to claim 1, wherein A represents a covalent bond or a divalent hydrocarbon group comprising from 1 to 1800 carbon atoms.

16. The rubber composition according to claim 15, wherein A represents a covalent bond or a divalent hydrocarbon group comprising from 2 to 300 carbon atoms.

17. The rubber composition according to claim 1, wherein A represents a divalent hydrocarbon group comprising from 2 to 100 carbon atoms.

18. The rubber composition according to claim 17, wherein A represents a divalent hydrocarbon group comprising from 2 to 65 carbon atoms.

19. The rubber composition according to claim 1, wherein A is a divalent group of aliphatic or aromatic type or a group comprising at least one aliphatic part and one aromatic part.

20. The rubber composition according to claim 1, wherein A is a divalent group of aliphatic type or a group comprising at least one aliphatic part and one aromatic part.

21. The rubber composition according to claim 1, wherein A is a divalent group of saturated or unsaturated aliphatic type.

22. The rubber composition according to claim 1, wherein A is an alkylene group.

23. The rubber composition according to claim 1, wherein A is interrupted by at least one heteroatom selected from the group consisting of oxygen, nitrogen and sulfur.

24. The rubber composition according to claim 23, wherein A is interrupted by at least one oxygen atom.

25. The rubber composition according to claim 1, wherein A is substituted by at least one radical selected from the group consisting of alkyl, cycloalkylalkyl, aryl, aralkyl, hydroxyl, alkoxy, amino and carbonyl radicals.

26. The rubber composition according to claim 1, wherein A is substituted by one or more carboxylic acid functional groups and/or by one or more hydrocarbon radicals selected from the group consisting of alkyl, cycloalkyl, cycloalkylalkyl, aryl and aralkyl radicals, themselves substituted by one or more carboxylic acid functional groups.

27. The rubber composition according to claim 1, wherein A does not comprise another carboxylic acid functional group.

28. The rubber composition according to claim 1, wherein the content of polyacid is within a range extending from 0.2 to 100 phr.

29. The rubber composition according to claim 28, wherein the content of polyacid is within a range extending from 0.2 to 50 phr.

30. The rubber composition according to claim 1, wherein $R_1$ represents a hydrogen atom or an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms, which group can optionally be interrupted by one or more heteroatoms and/or substituted, $R_2$ represents an alkyl group having from 1 to 20 carbon atoms, a cycloalkyl group having from 5 to 24 carbon atoms, an aryl group having from 6 to 30 carbon atoms or an aralkyl group having from 7 to 25 carbon atoms, which group can optionally be interrupted by one or more heteroatoms and/or substituted, $R_3$ and $R_4$ independently represent identical or different groups selected from the group consisting of hydrogen, alkyl groups having from 1 to 20 carbon atoms, cycloalkyl groups having from 5 to 24 carbon atoms, aryl groups having from 6 to 30 carbon atoms and aralkyl groups having from 7 to 25 carbon atoms, which groups can optionally be interrupted by heteroatoms and/or substituted, or else $R_3$ and $R_4$ form, together with the carbon atoms of the imidazole ring to which they are attached, a ring selected from the group consisting of aromatic, heteroaromatic and aliphatic rings comprising from 5 to 12 carbon atoms.

31. The rubber composition according to claim 30, wherein $R_3$ and $R_4$ form, together with the carbon atoms of the imidazole ring to which they are attached, a ring selected from the group consisting of aromatic, heteroaromatic and aliphatic rings comprising from 5 to 6 carbon atoms.

32. The rubber composition according to claim 1, wherein $R_1$ represents a group selected from the group consisting of alkyl groups having from 2 to 12 carbon atoms and aralkyl groups having from 7 to 13 carbon atoms, which groups can optionally be substituted.

33. The rubber composition according to claim 1, wherein $R_1$ represents an optionally substituted aralkyl group having from 7 to 13 carbon atoms and $R_2$ represents an alkyl group having from 1 to 12 carbon atoms.

34. The rubber composition according to claim 1, wherein $R_1$ represents an optionally substituted aralkyl group having from 7 to 9 carbon atoms and $R_2$ represents an alkyl group having from 1 to 4 carbon atoms.

35. The rubber composition according to claim 1, wherein $R_3$ and $R_4$ independently represent identical or different groups selected from the group consisting of hydrogen, alkyl groups having from 1 to 12 carbon atoms, cycloalkyl groups having from 5 to 8 carbon atoms, aryl groups having from 6 to 24 carbon atoms and aralkyl groups having from 7 to 13 carbon atoms, which groups can optionally be substituted.

36. The rubber composition according to claim 1, wherein $R_3$ and $R_4$ form, with the carbon atoms of the imidazole ring to which they are attached, a phenyl, cyclohexene or cyclopentene ring.

37. The rubber composition according to claim 1, wherein the imidazole content is within a range extending from 0.01 to 4 molar equivalents with respect to the carboxylic acid functional groups present on the polycarboxylic acid of general formula (I).

38. The rubber composition according to claim 37, wherein the imidazole content is within a range extending from 0.01 to 3 molar equivalents with respect to the carboxylic acid functional groups present on the polycarboxylic acid of general formula (I).

39. The rubber composition according to claim 1, wherein the total content of reinforcing filler is within a range extending from 5 to 200 phr.

40. The rubber composition according to claim 1, wherein the silica content is within a range extending from 5 to 200 phr.

41. The rubber composition according to claim 40, wherein the silica content is within a range extending from 10 to 150 phr.

42. The rubber composition according to claim 1, wherein the reinforcing filler comprises carbon black in a minor amount.

43. The rubber composition according to claim 42, wherein the reinforcing filler comprises carbon black at a content within a range extending from 0.1 to 100 phr.

44. The rubber composition according to claim 43, wherein the reinforcing filler comprises carbon black at a content within a range extending from 0.1 to 30 phr.

45. The rubber composition according to claim 1, wherein silica represents the reinforcing filler in its entirety.

46. The rubber composition according to claim 1, wherein the agent for covering the silica is selected from the group consisting of hydroxylated or hydrolysable silanes, polyols, polyethers, amines, hydroxylated or hydrolysable polysiloxanes, guanidine derivatives, alkali metal or alkaline earth metal hydroxides, and mixtures thereof.

47. The rubber composition according to claim 46, wherein the agent for covering the silica is selected from the group consisting of amines, guanidine derivatives, alkali metal or alkaline earth metal hydroxides and mixtures thereof.

48. The rubber composition according to claim 47, wherein the agent for covering the silica is selected from the group consisting of primary amines, guanidine derivatives, alkali metal or alkaline earth metal hydroxides and mixtures thereof.

49. The rubber composition according to claim 48, wherein the agent for covering the silica is diphenylguanidine or octadecylamine.

50. The rubber composition according to claim 49, wherein the agent for covering the silica is present at a content within a range extending from 0.5 to 30 phr.

51. The rubber composition according to claim 49, wherein the agent for covering the silica is present at a content within a range extending from 1 to 15 phr.

52. A tire comprising the rubber composition according to claim 1.

53. The tire according to claim 52, wherein the agent for covering the silica is present at a content within a range extending from 0.5 to 30 phr and wherein the rubber composition serves as a tread composition.

* * * * *